2,889,367
4-ACYL-1,1-DIMETHYL-6-t-BUTYL INDANES

Muus G. J. Beets, Harm Van Essen, and Wilhelmina Meerburg, Hilversum, Netherlands, assignors to N.V. Polak & Schwarz's Essencefabrieken, Hilversum, Netherlands, a limited liability company of the Netherlands No Drawing. Application March 21, 1956
Serial No. 572,837

Claims priority, application Netherlands April 2, 1955

3 Claims. (Cl. 260—592)

From researches by M. Stoll (Manufacturing Perfumer 1 (1937), 107) it is known that macrocyclic compounds with 14 to 19 rings, such as lactones and ketones, have a strong pure musk odor, owing to which compounds of this type could find an extensive application as perfumes.

Another group of compounds which is of great importance owing to their msuk odor is that of the aromatic nitro compounds (T. F. West, H. J. Strausz and D. R. H. Barton; Synthetic Perfumes 1949, page 297), of which trinitro-2-4-6-dimethyl-1-3 tertiary butyl-5-benzene (xylene musk); dinitro-3-5-dimethyl-2-6-tertiary butyl-4-acetophenone (ketone musk) and methoxy-3-dintro-2-6-tertiary butyl-1-4-toluene (ambrette musk) are the outstanding representatives.

Macrocyclic compounds usually must be prepared by complicated processes and are, therefore, expensive. They have, however, a very fine odor and excellent fixing properties and are highly resistant to the action of light and alkali.

The nitro compounds, on the contrary, can be produced at a low price but they have a much coarser odor than the macrocyclic compounds, whilst their tendency to discoloring, especially when they have not been purified to an extremely high degree, is to be considered as a disadvantage.

According to the present invention, there is provided a novel group of odorants and flavoring substances with musk odor which, on the one hand, can be prepared in a simple manner while, on the other hand, they are extremely stable and have a musk odor and flavor which displays a remarkable similarity to that of the macrocyclic compounds, such as pentadecanolide.

We have found that compounds with a structure of the following characteristic features have a musk odor and flavor:

(1) An indane having skeleton

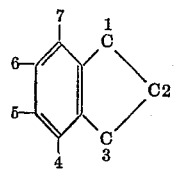

(2) A carbonyl group attached to the aromatic nucleus, except at position 1 of the non-aromatic ring.

(3) The aromatic nucleus carries at least two tertiary or quaternary carbon atoms, one of which does not form a part of the non-aromatic ring.

(4) The molecule should contain approximately 14–20 carbon atoms.

Th following elucidates the above four criteria.

The carbonyl group may be, for instance, acetyl, propionyl or formyl.

One of the tertiary or quaternary carbon atoms forms a part of a separate substituent in the aromatic nucleus, e.g. of an isopropyl, secondary butyl, tertiary butyl or tertiary amyl group, whilst the other is obtained by substituting the carbon atom 1 or 3, resp. 1 or 4 simply or doubly by lower alkyl groups such as methyl or ethyl.

The positions both in the aromatic and non-aromatic rings, not taken by the above-mentioned substituents essential for the musk character, can be taken by other substituents, in as far as this is stearically possible, such as lower alkyl groups, provided the total number of carbon atoms remains within the indicated limits.

In case of indane derivatives, if the separate substituent in the aromatic nucleus is an isopropyl group, the number of substituents in the positions 1, 2 and 3 together amounts to at most 3.

The requirement mentioned under (4) is more or less arbitrary since the musk odor varies in strength from extremely weak to very strong without it being possible to say where it entirely disappears. Compounds of this type with a smaller number of carbon atoms have a different odor which gradually changes to a weak musk odor while with an increase of the number of carbon atoms, the musk odor gradually becomes weaker till it disappears entirely with approximately 20 carbon atoms. These limits are fairly well defined by the indicated range of approximately 14–20 carbon atoms. Compounds near the limits of the structure class defined often have only a very weak, hardly perceptible musk odor but, in most of these cases, the fixing properties are still strong.

The preparation of compounds of this type is feasible in a simple manner according to known methods.

In most cases, the starting material is selected from indane derivatives having already a tertiary or quaternary carbon atom in the non-aromatic ring which carbon atom is attached to the aromatic nucleus. The preparation of some of such hydrocarbons has been described by Bogert (J. Am. Chem. Soc. 56, 185 (1934); 57, 151 (1935)) and they can be easily obtained by ring closure of aryl aliphatic carbinols, such as methyl-2-phenyl-4 butanol-2 or of the corresponding unsaturated hydrocarbons. Also, cyclization of aryl aliphatic carboxylic acids or carboxylic acid halides or ketones, or condensation of aromatic compounds with unsaturated acids leads to indane compounds which can be used for the purpose in view.

The crude material may also be an indane derivative in which one of the further required substituents is present. An example herefor is the following series of conversions.

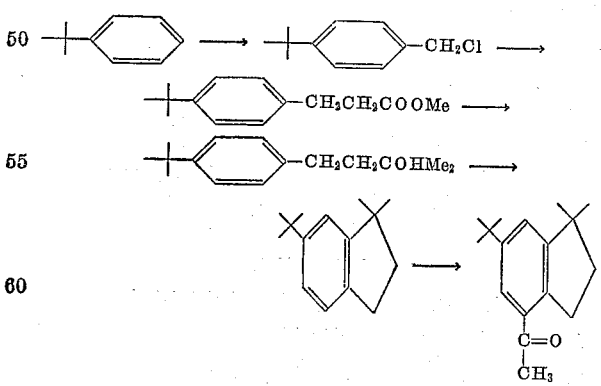

The required substituents, in as far as they do not yet form a part of the primarily prepared indane system, can be introduced according to known methods. E.g. a tertiary or secondary alkyl group can be introduced with the aid of alkenes or isoalkenes, secondary or tertiary alcohols, secondary or tertiary halides, and the carbonyl group with the aid of acyl halides, carboxylic acids or carboxylic anhydrides, mixtures of carbon monoxide or hydrocyanic acid with hydrochloric acid, in either case under the influence of catalysts of the Friedel-Crafts type, such as sulphuric acid, phosphoric acid, polyphosphoric acid, aluminum chloride, boron fluoride, zinc chloride, etc. The carbonyl group can also be introduced in a more indirect manner, e.g. by chloro alkylation, followed by oxidation or by dehydration, followed by oxidation of a secondary or tertiary carbinol.

Compounds with the most suitable and strongest musk odor and flavor are obtained when a tertiary alkyl group and a carbonyl group are introduced into dialkyl-1-1-indane, e.g. acetyltertiary butyl-dimethyl-1-1-indane, propionyl-tertiary butyl dimethyl-1-1 indane and formyl-tertiary butyl dimethyl-1-1 indane but other compounds of this structure type also have useful properties.

That the structural criteria defined above indeed limit the range of the musk odor is shown by the following examples.

When only one quaternary or tertiary carbon atom is present, the products do not have a musk odor. E.g. the compounds obtained by tertiary butylation and acetylation of indane and those obtained by acetylation of dimethyl-1-1 indane are not suitable, whereas on the contrary, as said above, the compounds obtained by introduction of a tertiary butyl group or an isopropyl group and an acetyl group into dimethyl-1-1 indane have a strong, pure musk odor.

The invention also comprises mixtures, especially perfumery compositions, perfumes, lotions, perfumed powders, soap and the like, containing one or more odorants and flavoring substances with musk character having the characterizing features mentioned in the specification.

The invention is elucidated by the following examples.

EXAMPLE 1

*Acetyl-tertiary butyl-dimethyl-1-1 indane*

To a mixture of 1423 g. of concentrated sulphuric acid and 76.5 g. of ice 730 g. of dimethyl-1-1 indane are added at 15° C. during 10 minutes and thereupon a mixture of 185 g. of tertiary butanol and 30 g. of dimethyl-1-1 indane at 10° C. in 1¼ hour. One stirs during a further 1½ hour at 10–17° C. and processes. One fractionates in vacuo with the aid of a suitable column. The tertiary butylation produce, B.P. 90–97° C. 2½ mm.; $n_D^{20}$ 1.5080–1,5100 is obtained in a yield of 91.2% of the theory.

To a mixture of 4780 g. of carbon tetrachloride, 565 g. (7.2 mol) of acetylchloride and 1212 g. of dimethyl-tertiary butyl indane (prepared in the above-mentioned manner) 881 g. of aluminumchloride (6.6 mol) are added at 0–5° C. in 4 hours. One stirs for a further 2 hours at the same temperature and processes. After fractionation and crystallisation (1) a crystallized pure main product of M.P. 77.2–77.70 C. in a yield of about 55% of the theory with a pure strong musk odor of the pentadecanolide type, probably 4-acetyl-1-1-dimethyl-6-tertiary butyl-indane; (2) a very slight amount of an isomer, probably 6-acetyl-1-1-dimethyl-4-tertiary butyl indane with M.P. 105.2–106.0° C. having also a strong pentadecanolide-like odor are obtained.

EXAMPLE 2

*Propionyl-tertiary butyl-dimethyl-1-1-indane*

5000 g. of carbon tetrachloride, 610.5 g. (6.6 mol) of propionyl chloride and 1212 g. (6 mol) of dimethyl-1-1 tertiary butyl indane are introduced into a reaction flask of 6 liters. 881 g. of aluminum chloride are added while stirring in approximately 4 hours at 3–5° C. and one stirs during a further 2 hours. One pours on a mixture of ice and hydrochloric acid and processes.

The reaction product is fractionated in vacuo through a 16-plate column and crystallizing fractions are purified by recrystallization.

272 g. of liquid fore-runs are obtained having practically an entirely constant boiling point (103–104° C. at 0.2 mm.) and a constant refractory index ($n_D^{20}$ 1.5340). This compound has a carbonyl content of 4.84 m.eq./g. and probably is propionyldimethylindane. Yield 22.4% of the theory.

As the main product furthermore 52.4% of the theory of propionyl-dimethyl-tertiary butylindane, M.P. 45.1–45.9° C. is obtained which compound has a strong musk odor.

Finally a small amount of an isomeric compound is obtained, M.P. 59–60° C. having also a musk odor.

EXAMPLE 3

*Acetyl-4-dimethyl-1-1-tertiary butyl-6-indane*

38 g. of sodium are dissolved in 400 g. of absolute methanol and 512 g. of diethyl malonate are added in 10 min. at 40° C. One cools to 20° C. and adds 292 g. of tertiary butyl-4-benzylchloride while stirring in 1½ hours. The mixture is allowed to stand at room temperature until the reaction has ended.

Saponification is effected with the distilling off of ethanol and gradual addition of 960 g. of 33% caustic soda lye and so much water as is necessary to maintain the mass in a condition in which it can be stirred.

One stirs for another 2 hours while boiling and acidifies in the heat with diluted sulphuric acid. One separates the upper layer and decarboxylates in known manner. The crude tertiary butyl-4-phenyl-propionic acid is purified by vacuum distillation and recrystallization from petroleum ether. M.P. 110–112° C. Yield 74% of the theory.

217 g. of tertiary butyl-4-phenyl-propionic acid are introduced into a mixture of 640 g. of methanol and 40 g. of sulphuric acid and boiled during 5 hours. After processing the methyl ester is fractionated. Yield practically quantitative B.P. 128° C./3 mm. Solidification point 40° C.

In known manner a solution of methylmagnesium bromide is prepared from 58.3 g. of magnesium and 222 g. of methyl-tertiary butyl-4-phenyl propionate are added while stirring in 3 hours at 0–4° C. After processing one fractionates.

B.P. 136–138° C./3 mm.; $n_D^{20}$ 1.5030–1.5038. Solidification point approximately 40° C.

207 g. of methyl-3-(tertiary butyl-4'-phenyl)-1-butanol-3 are added while stirring in 1 hour at 0–5° C. to a mixture of 540 g. of sulphuric acid and 66 g. of water. One stirs for another hour at the same temperature and again 1½ hours at 10–15° C. After processing 158 g. of dimethyl-1-1-tertiary butyl-6-indane are obtained, B.P. 97° C./4 mm.; $n_D^{20}$ 1.5070.

To the complex prepared in known manner from 119 g. of aluminumchloride, 80 g. of acetylchloride in 600 g. of carbon tetrachloride, 158 g. of dimethyl-1-1-tertiary butyl-6-indane are added in 2 hours at 0–5° C. One stirs during 1 hour at the same temperature and processes in normal manner. The reaction product is rapidly distilled in vacuo without a column. It crystallizes entirely and is recrystallized from methanol. M.P. (corr.) 76.7–77.2° C. Yield 125 g. or 65% of the theory.

A mixed melting point with the product prepared according to Example 1 does not show a depression. The product has a strong odor and flavor, having a strong resemblance to those of pentadecanolide.

EXAMPLE 4

*Formyl-4-dimethyl-1-1-tertiary butyl-6-indane*

According to Example 1 tertiary butyl-dimethyl-1-1-indane is prepared

A mixture of 730 g. of tertiary butyl-dimethyl-1-1-indane, 150 g. of para-formaldehyde and 100 g. of zinc chloride is brought into a normal reaction apparatus. One heats while stirring to 65° C. and passes a flow of dry hydrogen chloride into the flask during 1 hour and 40 min. at 65–75° C.

The lower layer is separated and the upper layer stirred with 55 g. of dry sodium bicarbonate during 15 minutes. After filtering distillation is effected in vacuo without a column. B.P. 110–175° C./3 mm. Yield 736 g.

The product is distilled in vacuo through a suitable column. Fractions with a boiling point 130–140° C./3½ mm. are used together for the following reaction.

During 3 hours a mixture of 300 g. of acetic acid, 200 g. of water, 280 g. of hexamethylene tetramine and 155 g. of chloromethyl-tertiary butyl-dimethyl-1-1-indane is boiled while stirring.

300 g. of 36% hydrochloric acid are added and one boils during 45 min. One cools, takes up into benzene and washes to neutral reaction. The reaction product is fractionated through a 13-plate column and as the main product a viscous liquid is obtained, B.P. 105–106° C./0.3 mm.; $n_D^{20}$ 1.5300–1.5309. This crystallizes practically entirely and is purified by recrystallization from ethanol. The desired aldehyde is obtained in good yield as a white crystalline compound. M.P. (corr.) 54.0–54.5° C.

The product has a very strong pure musk odor and flavor.

EXAMPLE 5

Perfume composition

A simple jasmine composition is prepared as follows (the numbers are parts by weight):

| | |
|---|---|
| Phenyl ethyl alcohol | 10 |
| Benzyl propionate | 10 |
| Benzyl acetate | 40 |
| Amyl cinnamic aldehyde | 30 |
| Linalyl acetate | 5 |
| Linanoöl | 5 |

To this composition 2½% of propionyl tertiary butyl-dimethyl-1-1-indane are added, by which the odor of the composition is rounded, the coarse fruit-like odor of the benzyl esters is forced to the background and a natural jasmine character comes to the fore. This composition can be used in soap.

EXAMPLE 6

Perfume composition

A composition is prepared as follows (the numbers are parts by weight):

| | |
|---|---|
| Benzyl acetate | 15 |
| Amyl cinnamic aldehyde | 15 |
| Phenyl ethyl alcohol | 15 |
| Hydroxy citronellal | 15 |
| Rhodinol | 5 |
| Terpineol | 5 |
| α-Ionone | 10 |
| Bergamot oil | 10 |
| Ylang | 2 |
| Benzoic resin | 4 |
| Styrax | 4 |

To this composition 2½% are added of the following musk odorants: pentadecanolide, acetyl-tertiary butyl-dimethyl-1-1-indane, propionyl-tertiary butyl-dimethyl-1-1-indane, ambrette musk, ketone musk and xylene musk and the result is considered by a group of observers. All observers preferred pentadecanolide, immediately followed by the composition prepared with the aid of both indane derivatives mentioned. The odor of the latter was preferred by all observers over that of the compositions prepared with the aid of the nitro aromatic kinds of musk.

What is claimed is:

1. As a new compound, 4-acetyl-1,1-dimethyl-6-tert. butyl-indane.

2. As a new compound, 4-propionyl-1,1-dimethyl-6-tert.butyl-indane.

3. As a new compound, 4-formyl-1,1-dimethyl-6-tert,-butyl-indane.

References Cited in the file of this patent

UNITED STATES PATENTS

| | | |
|---|---|---|
| 2,752,404 | Polak | June 26, 1956 |
| 2,759,022 | Fuchs | Aug. 14, 1956 |
| 2,800,511 | Carpenter et al. | July 23, 1957 |